United States Patent [19]
Ito et al.

[11] Patent Number: 5,541,900
[45] Date of Patent: Jul. 30, 1996

[54] OPTICAL INFORMATION RECORDING AND REPRODUCING APPARATUS AND METHOD FOR DIFFERENT SPOT SIZE TYPE MEDIA

[75] Inventors: Motoshi Ito, Moriguchi; Isao Satoh, Neyagawa, both of Japan

[73] Assignee: Matsushita Electric Industrial Co., Ltd., Osaka, Japan

[21] Appl. No.: 152,397

[22] Filed: Nov. 12, 1993

[30] Foreign Application Priority Data

Nov. 12, 1992 [JP] Japan ..................... 4-302018

[51] Int. Cl.⁶ ........................................ G11B 7/09
[52] U.S. Cl. .......................... 369/44.31; 369/44.29; 369/54; 369/58
[58] Field of Search ................ 369/44.26, 44.27, 369/44.29, 44.31, 54, 58, 109, 111, 121, 122, 47, 50

[56] References Cited

U.S. PATENT DOCUMENTS

| | | | |
|---|---|---|---|
| 5,042,020 | 8/1991 | Endo | 369/58 X |
| 5,235,581 | 8/1993 | Miyagawa et al. | 369/58 X |
| 5,329,510 | 7/1994 | Tsuyuguchi et al. | 369/58 X |

FOREIGN PATENT DOCUMENTS

| | | |
|---|---|---|
| 63-217541 | 9/1988 | Japan . |
| 1-43020 | 6/1989 | Japan . |
| 3-157820 | 7/1991 | Japan . |
| 3-276446 | 12/1991 | Japan . |
| 5-73983 | 3/1993 | Japan . |

*Primary Examiner*—W. R. Young
*Attorney, Agent, or Firm*—Ratner & Prestia

[57] ABSTRACT

Optical information recording and reproducing apparatus and method of the invention perform the recording and reproducing for various types of information recording media each having a converged laser spot size different from the spot sizes of the other types. The optical information recording and reproducing apparatus includes a spot size recognizing circuit for recognizing a spot size suitable for an information recording medium to be loaded, and performs erasing, recording, and reproducing to the information recording medium by defocusing or by off-tracking based on the spot size recognized by the spot size recognizing circuit.

6 Claims, 11 Drawing Sheets

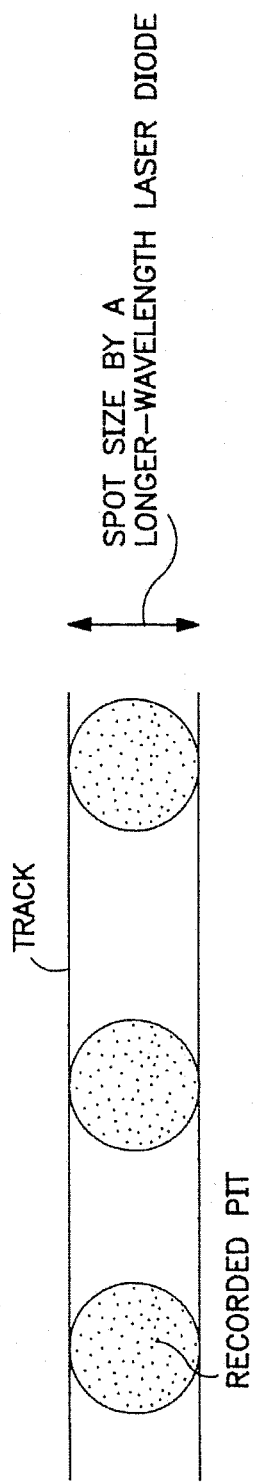
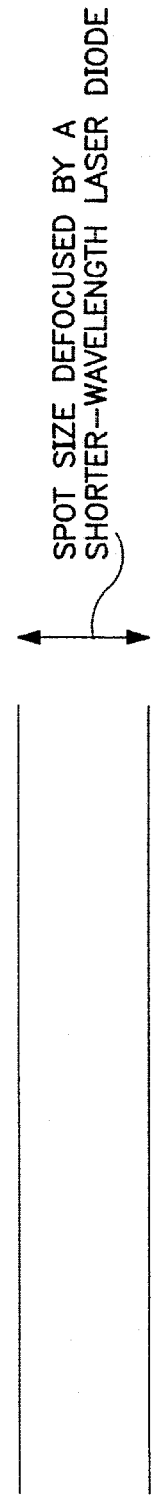
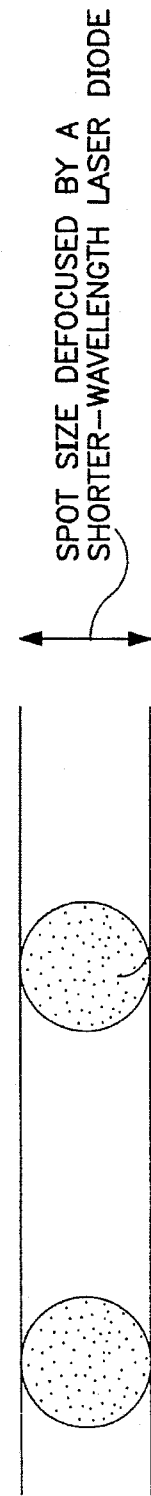
FIG. 4A
FIG. 4B
FIG. 4C

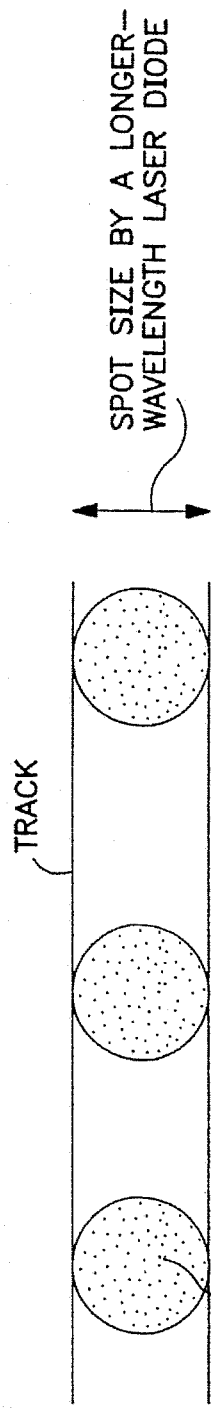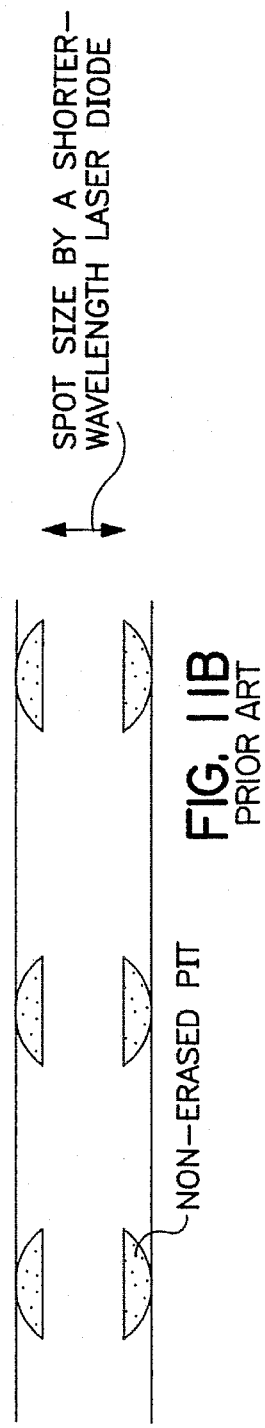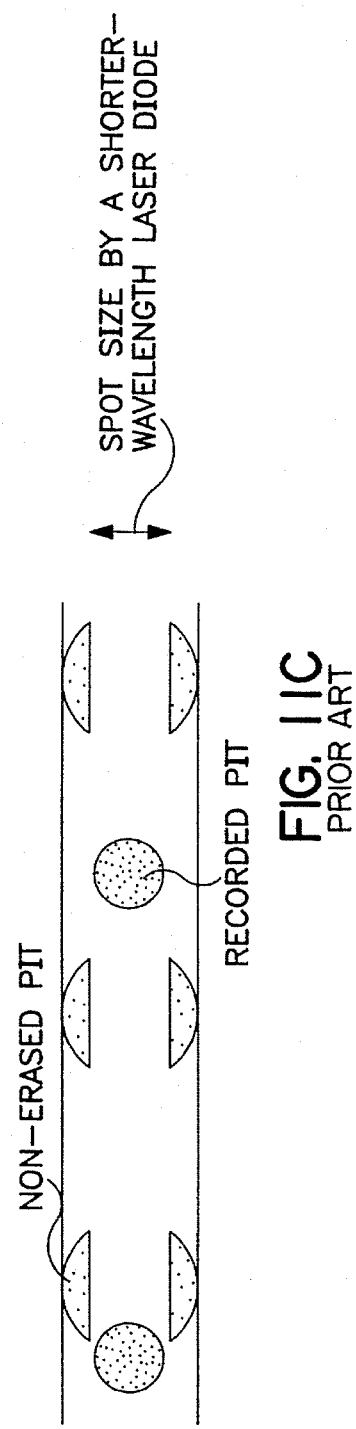
FIG. 11A PRIOR ART
FIG. 11B PRIOR ART
FIG. 11C PRIOR ART

OPTICAL INFORMATION RECORDING AND REPRODUCING APPARATUS AND METHOD FOR DIFFERENT SPOT SIZE TYPE MEDIA

BACKGROUND OF THE INVENTION

Field of the Invention

The present invention relates to an optical information recording and reproducing apparatus and an optical information recording and reproducing method both of which are used for recording and reproducing information by converging a laser beam so as to form a minute spot on an information recording medium. More particularly, the present invention relates to an optical information recording and reproducing apparatus and an optical information recording and reproducing method both of which can be compatibly used for recording and reproducing information for a plurality of different types of information recording media each having inherent spot size of laser beam to be converged, by using a laser beam of a fixed wavelength.

Description of the Related Art

Recently, an information recording and reproducing apparatus which deals with a large-capacity and exchangeable information recording medium has been widely used. Especially, an optical disk apparatus is suitable for such a large-capacity and exchangeable information recording medium, because in the optical disk apparatus, a laser beam is utilized so as to form minute pits on an optical disk which serves as an information recording medium, thereby performing the recording and reproducing. The laser diode used in an optical disk apparatus which is commercially available emits a laser beam having a wavelength of 780–830 nm.

The distribution of the intensity of light output from the laser diode is substantially equivalent to the Gauss distribution, so that the output light is called a Gauss beam. The Gauss beam has a feature that the same intensity distribution thereof is maintained irrespective of the propagating distance of the light. When the intensity distribution of the Gauss beam is represented by I, the intensity distribution I is expressed by the following Expression (1):

$$I = \frac{2P}{\pi \omega^2} \exp\left(-\frac{2r^2}{\omega^2}\right), \quad (1)$$

where P denotes a laser power, W denotes a radius for which the intensity is $1/e^2$ of the intensity at the center, and r denotes a distance from the center. Herein, the diameter of 2 W for which the intensity is $1/e^2$ of the intensity at the center is referred to as the spot size. Since the laser beam hyperbolically propagates by means of a focusing lens, the spot size is minimum at the focal point thereof. The spot size $2W_o$ at the focal point is approximately in proportion to the wavelength λ of the laser beam and in inverse proportion to the numerical aperture NA of the focusing lens. The relationship therebetween is expressed by the following Expression (2):

$$2\omega_0 = K \frac{\lambda}{NA}, \quad (2)$$

where K is a constant determined by the shape of the aperture of the focusing lens and the intensity distribution of the incident light flux, and K is about 0.6. It is known that, in the case of the focusing lens usually used in an optical disk apparatus, the spot size is substantially equal to a wavelength of the laser beam.

In order to record a maximum amount of information on an optical disk, it is necessary to perform the recording and reproducing by using a minimum spot size. For this purpose, the optical disk apparatus is provided with a focus servo function by which the focal point of the laser beam is positioned on the recording face of the optical disk. Due to the focus servo function, a pit having a size substantially equal to the wavelength of the laser beam is formed on the optical disk.

On the optical disk, a spiral track is formed, and pieces of information are represented by a series of pits along the track. Therefore, in order to record or reproduce the desired information, it is necessary to cause the focal point of the laser beam to follow the track on which the information is recorded or from which the information is reproduced. Note that the center of the target track is least influenced by the adjacent track. Therefore, the optical disk apparatus is also provided with a tracking servo function by which the focal point of the laser beam is caused to follow the center of the track formed on the recording face of the optical disk.

As to a hard disk apparatus as a representative example of an information recording and reproducing apparatus, the capacity thereof is increasing daily. In the case of the hard disk apparatus, the size of a recorded pit is reduced by decreasing the distance between a magnetic head and the magnetic recording medium, so that an amount of information per unit area is increased. Also, as to the optical disk apparatus, a technique for increasing the recording capacity is being researched and developed. Especially, with the technological progress in semiconductor processes, a laser diode which can emit light having a wavelength of 680 nm and a high output capability has recently become available. Due to this situation, an optical disk apparatus in which a smaller recorded pit can be formed by a smaller spot size using a combination of a laser diode which emits light having a wavelength shorter than that of light emitted from the conventional laser diode and a focusing lens having a larger numerical aperture has been developed.

In the development of an optical disk apparatus in which the recorded pit size can be made smaller, it is desirable that the apparatus includes an upper compatibility such that information is recorded on and reproduced from an optical disk having larger pits recorded by an earlier optical disk apparatus. However, in the case of different spot sizes, it is difficult to provide recording compatibility. Hereinafter, the problem in the recording compatibility will be described with reference to FIGS. 11A to 11C.

FIG. 11A shows recorded pits on an optical disk which are recorded by an optical disk apparatus using a long-wavelength laser diode, i.e., having a larger spot size. FIG. 11B shows recorded pits on the optical disk after the recorded pits shown in FIG. 11A are erased by an optical disk apparatus using a short-wavelength laser diode, i.e., having a smaller spot size. As is seen from FIG. 11B, the optical disk apparatus having a smaller spot size cannot erase the recorded pits completely, so that non-erased pits remain in the portions where the spot of smaller size does not cover. FIG. 11C shows recorded pits which are recorded by the optical disk apparatus having a smaller spot size on the optical disk after the erasing shown in FIG. 11B. When the recorded pits are to be reproduced by the optical disk apparatus having a larger spot size, in addition to the rewritten recorded pits, the non-erased pits appear as signals. Therefore, the reproducing cannot be properly performed.

As described above, in the conventional optical information recording and reproducing apparatus, the spot size is uniquely determined by the wavelength of the laser beam and the numerical aperture of the focusing lens, so that the conventional apparatus includes a problem that it is difficult to record and reproduce information for various information recording media having recorded pits of different sizes.

SUMMARY OF THE INVENTION

The optical information recording and reproducing apparatus of the invention for performing the recording and reproducing for various types of information recording media each having a converged laser spot size different from the spot sizes of the other types, includes: spot size recognizing means for recognizing a spot size suitable for an information recording medium which is loaded in the apparatus; and compatible recording and reproducing means for performing erasing, recording and reproducing for the information recording medium based on the spot size recognized by the spot size recognizing means.

In one embodiment of the invention, the compatible recording and reproducing means includes: variable focus servo means for adjusting a defocus amount which indicates a difference between a recording face of the information recording medium and a focal point of a laser beam emitted to the information recording medium; defocus amount calculating means for calculating a defocus amount for compatible control, based on the spot size recognized by the spot size recognizing means and the spot size of the laser beam; and recording and reproducing compatible control means for performing erasing, recording, and reproducing by setting the defocus amount for compatible control calculated by the defocus amount calculating means in the variable focus servo means.

In another embodiment of the invention, the compatible recording and reproducing means includes: variable tracking servo means for adjusting an off-track amount which indicates a difference between the center of a track formed on the recording face of the information recording medium and the focal point of the laser beam emitted to the information recording medium; off-track amount calculating means for calculating a plurality of off-track amounts for compatible control, based on the spot size recognized by the spot size recognizing means and the spot size of the laser beam; and recording and reproducing compatible control means for setting, when erasing is to be performed, the plurality of off-track amounts for compatible control calculated by the off-track amount calculating means in the variable tracking servo means, thereby performing an erasing operation for each amount, and for setting, when recording and reproducing are to be performed, an off-track amount of 0 in the variable tracking servo means, thereby performing the recording and reproducing.

In another embodiment of the invention, the optical information recording and reproducing apparatus further includes, self-recorded area management means for managing an area recorded by the apparatus itself, by recording information indicative of the area recorded by the apparatus itself in a specific area of the information recording medium and by reading the information from the specific area prior to recording and reproducing, wherein, when erasing is to be performed for an area other than the self-recorded area, the compatible recording and reproducing means performs the erasing to the information recording medium based on the spot size recognized by the spot size recognizing means, and when recording and reproducing, and erasing for the self-recorded area are to be performed, the compatible recording and reproducing means performs usual recording, reproducing, and erasing.

According to another aspect of the invention, an optical information recording and reproducing method for performing the recording and reproducing for various types of information recording mediums each having a converged laser spot size different from the spot sizes of the other types is provided. The method includes: a spot size recognizing step for recognizing a spot size suitable for an information recording medium to be loaded; and a compatible recording and reproducing step for performing erasing, recording and reproducing step for the information recording medium based on the spot size recognized by the spot size recognizing. step.

In one embodiment of the invention, the compatible recording and reproducing step includes: a defocus amount calculating step for calculating a defocus amount for compatible control, based on the spot size recognized by the spot size recognizing step and the spot size of the laser beam; and a recording and reproducing compatible control step for performing erasing, recording, and reproducing under a condition that a defocus amount which indicates a difference between a recording face of the information recording medium and a focal point of a laser beam emitted to the information recording medium is set to be equal to the defocus amount for compatible control calculated by the defocus amount calculating step.

In another embodiment of the invention, the compatible recording and reproducing step includes: an off-track amount calculating step for calculating a plurality of off-track amounts for compatible control, based on the spot size recognized by the spot size recognizing step and the spot size of the laser beam emitted to the information recording medium; an erasing step for performing, when erasing is to be performed, an erasing operation for each off-track amount under a condition that the plurality of off-track amounts for compatible control calculated by the off-track amount calculating step are set to be equal to an off-track amount which indicates a difference between the center of a track formed on the recording face of the information recording medium and the focal point of the laser beam emitted to the information recording medium; and a recording and reproducing step for performing, when recording and reproducing are to be performed, the recording and reproducing under a condition that an off-track amount is set to be 0.

In another embodiment of the invention, the optical information recording and reproducing method further includes a step for recording information indicative of a self-recorded area in a specific area of the information recording medium and a step for reading the information from the specific area prior to recording and reproducing, thereby specifying the self-recorded area, wherein the recording and reproducing compatible control step includes: a step for performing, when erasing is to be performed for an area other than the self-recorded area, the erasing to the information recording medium based on the spot size recognized by the spot size recognizing step; and a step for performing, when recording and reproducing, and erasing for the self-recorded area are to be performed, usual recording, reproducing, and erasing.

With the above construction, the optical information recording and reproducing apparatus of the invention can perform recording and reproducing for various types of information recording mediums each having a recorded pit size different from the sizes of the other types by defocusing so that the spot size is adjusted to be equal to the recorded pit size of the information recording medium.

Alternatively, the recorded pits are erased by off-tracking on both the sides with respect to the track center of the information recording medium, so that the recording and reproducing can be performed for various types of information recording mediums each having a recorded pit size different from the sizes of the other types. In this case, since the spot size of the laser beam is small, a laser diode which necessitates lower output in order to obtain the same light amount per unit area can be used. Moreover, the self-recorded area can be identified, so that the erasing operation is not performed a plurality of times for the self-recorded area. Accordingly, it is possible to perform recording at a high speed.

Thus, the invention described herein makes possible the advantages of (1) providing an optical information recording and reproducing apparatus and an optical information recording and reproducing method both of which can compatibly perform the recording and reproducing for a plurality of different types of information recording mediums each having inherent spot size of laser beam to be converged, by using a laser beam of a fixed wavelength, and also (2) providing an optical information recording and reproducing apparatus and an optical information recording and reproducing method both of which are inexpensive and which can operate at a high speed.

These and other advantages of the present invention will become apparent to those skilled in the art upon reading and understanding the following detailed description with reference to the accompanying figures.

BRIEF DESCRIPTION OF THE DRAWINGS

FIGS. 4A, 4B, and 4C show recorded pits in Example 1 according to the present invention.

FIGS. 11A, 11B, and 11C show recorded pits in the prior art.

DESCRIPTION OF THE PREFERRED EMBODIMENTS

The present invention will be described below by way of illustrative examples.

EXAMPLE 1

Figure 1:
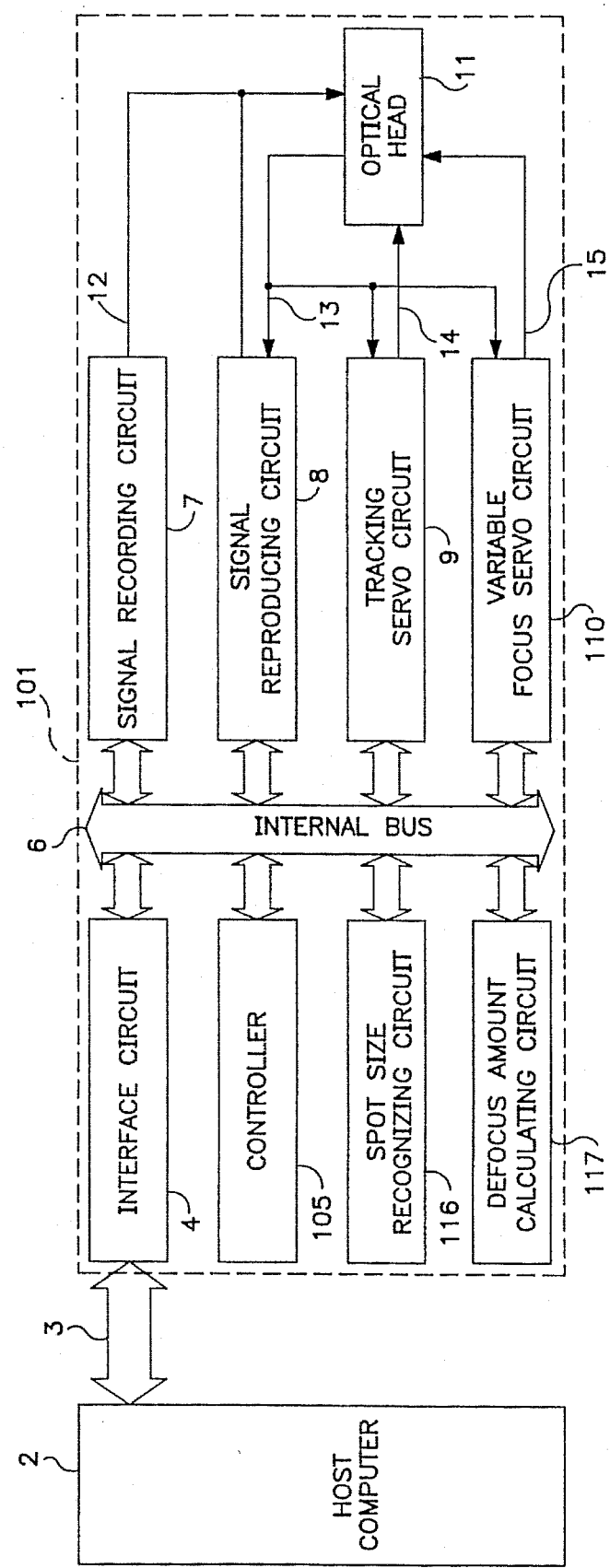
FIG. 1 is a block diagram showing a construction of an optical information recording and reproducing apparatus in Example 1 according to the present invention.

An optical information recording and reproducing apparatus in Example 1 according to the invention will be described with reference to FIG. 1. FIG. 1 is a block diagram showing the construction of the optical information recording and reproducing apparatus of this example. In this example, the spot size of a laser beam is adjusted by a defocusing method so as to be equal to the size of recorded pit on an information recording medium to be loaded, whereby the recording and reproducing of information can be performed for a plurality of different type information recording mediums each having a recorded pit size based on laser wavelength.

As is shown in FIG. 1, the optical information recording and reproducing apparatus 101 of this example includes an interface circuit 4, a signal recording circuit 7, a signal reproducing circuit 8, a tracking servo circuit 9, an optical head 11, a controller 105, a variable focus servo circuit 110, a spot size recognizing circuit 116, a defocus amount calculating circuit 117, and internal bus 6 for connecting various circuits to each other. The optical information recording and reproducing apparatus 101 is connected to a host computer 2 via host IF bus 3 by means of the interface circuit 4.

In the optical information recording and reproducing apparatus 101, the controller 105 controls the respective circuits via the internal bus 6 in accordance with the control programs stored therein. The interface circuit 4 controls the transfer of data to and from the host computer 2. The signal recording circuit 7 outputs a laser driving signal 12 to the optical head 11. During the erasing operation, the laser driving signal 12 is continuously output at an erasing level at which the magnetic field is biased in the erasing direction. During the recording operation, the laser driving signal 12 is output as a pulse signal at a recording level. At the recording level, the magnetic field is biased in the recording direction and the data to be recorded which is received by the interface circuit 4 is encoded. The signal reproducing circuit 8 continuously outputs the laser driving signal 12 at a reproducing level to the optical head 11. Also, the signal reproducing circuit 8 decodes a received-laser-beam signal 13 which is sent from the optical head 11, and delivers the decoded signal to the interface circuit 4 via the internal bus 6. The tracking servo circuit 9 internally generates a tracking error signal based on the received-laser-beam signal 13 from the optical head 11. Then, the tracking servo circuit 9 outputs a tracking actuator driving signal 14 to the optical head 11 so that the laser spot is formed at the center of the track on an information recording medium (not shown), based on the tracking error signal. By the tracking actuator driving signal 14, a tracking actuator (not shown) of the optical head 11 is driven.

The spot size recognizing circuit 116 recognizes a spot size suitable for the loaded information recording medium, from the type of tab switch attached to the cartridge of the information recording medium or the management information recorded on the control track of the information recording medium. The defocus amount calculating circuit 117 calculates the defocus amount required so that the spot size formed by a laser diode and a focusing lens mounted on the optical head 11 is made equal to the recognized spot size. The defocus amount calculated by the defocus amount calculating circuit 117 is set in the variable focus servo circuit 110 by the controller 105. In a case where the spot size is not known until the information recorded on the control track of the information recording medium is read out, a defocus amount of 0 is set in the variable focus servo circuit 110 as the default. The variable focus servo circuit 110 internally generates a focus error signal based on the received-laser-beam signal 13 from the optical head 11. Then, based on the focus error signal, the variable focus servo circuit 110 drives the focus actuator (not shown) of the optical head 11 in response to a focus actuator driving signal 15 so that the focal point of the laser beam is shifted by the set defocus amount from the recording face of the information recording medium.

The optical head 11 emits a laser beam in accordance with the laser driving signal 12, and outputs the received-laser-beam signal 13 which is obtained by converting the reflected beam from the information recording medium (not shown) into an electric signal. The optical head 11 also moves the laser spot in a radial direction of the information recording medium (not shown) in accordance with the tracking actuator driving signal 14, and makes the focal point of the laser beam closer to or farther away from the information recording medium (not shown) in accordance with the focus actuator driving signal 15.

Figure 2:
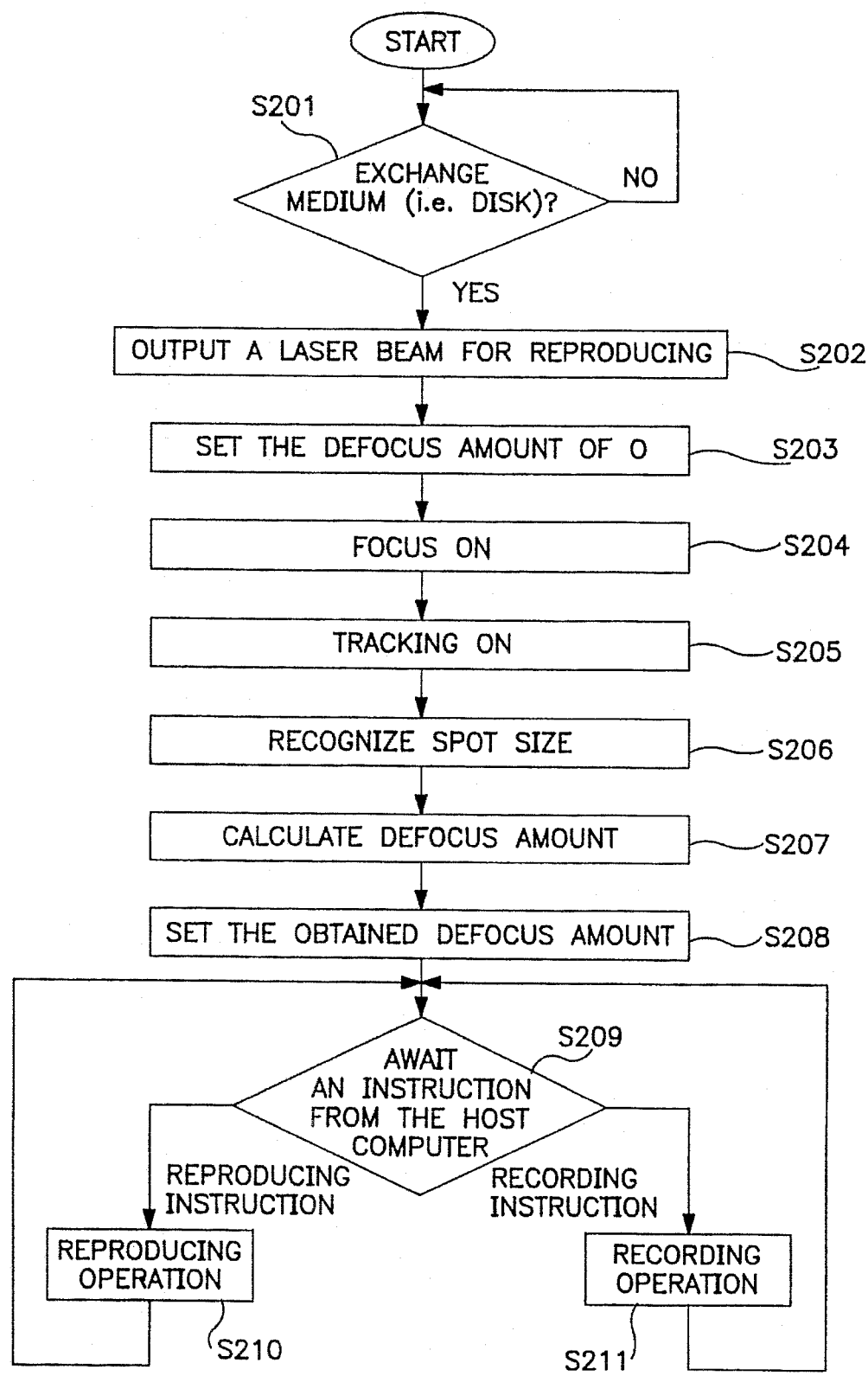
FIG. 2 is a flowchart illustrating an optical information recording and reproducing method in Example 1 according to the present invention.

Next, a compatible control method for performing the optical information recording and reproducing in the optical information recording and reproducing apparatus 101 with the above construction will be described. FIG. 2 is a flowchart illustrating the compatible control method for performing the optical information recording and reproducing. The compatible control method for performing the optical information recording and reproducing is implemented by the controller 105.

First, it is judged in step S201 whether the information recording medium is exchanged or not. If the information recording medium is not exchanged, the control is not performed. If the information recording medium is exchanged, the process proceeds to step S202. In step S202, the controller 105 instructs the signal reproducing circuit 8 to output the laser driving signal 12 to the optical head 11, whereby the optical head 11 emits a laser beam at the reproducing level.

Next, in step S203, a defocus amount of 0 is set in the variable focus servo circuit 110. Then, in step S204, the variable focus servo circuit 110 is instructed to start a focus servo operation. In step S205, the tracking servo circuit 9 is instructed to start a tracking servo operation.

Next, in step S206, the controller 105 controls the spot size recognizing circuit 116 to calculate a spot size suitable for the information recording medium. The recognized spot size is supplied to the defocus amount calculation circuit 117 where a defocus amount is calculated in step S207. The calculated defocus amount is set in the variable focus servo circuit 110 in step S208.

In step S209, the controller 105 waits for an instruction to be received from the host computer 2. If a reproducing instruction is received, the process proceeds to step S210 where the reproducing operation from the information recording medium is performed. If a recording instruction is received, the process proceeds to step S211 where the recording operation is performed to the information recording medium.

In step S206, the spot size recognizing circuit 116 can calculate the spot size by identifying the loaded information recording medium. For example, it can be identified whether the loaded information recording medium is the one which follows ISO 10090 as the standard of a 90-mm optical disk or not, based on the cartridge type described in ISO 10090 or the control track management information. If the information recording medium is the one which follows ISO 10090, it is specified that $\lambda'/NA'$ should be in the range of 1.44–1.51 µm where $\lambda'/NA'$ denotes a ratio of the wavelength $\lambda'$ to the numerical aperture NA' for the information recording medium.

Next, how the defocus amount calculating circuit 117 calculates a defocus amount is described.

The spot size 2 W for the Gauss beam can be expressed by the following Expression (3) as a hyperbolic function with respect to the distance from the focal point to the spot:

$$\omega^2(z) = \omega_0^2 \left(1 + \left(\frac{\lambda z}{\pi \omega_0^2}\right)^2\right), \quad (3)$$

where $W_0$ denotes a radial of the spot size at the focal point, $\lambda$ denotes a wavelength of the laser diode mounted on the optical head 11, and $\pi$ is the ratio of the circumference of a circle to its diameter. If Expression (3) is expanded with respect to z, and Expression (2) is substituted into Expression (3), the following Expression (4) is obtained:

$$z = \frac{\pi K^2}{NA} \left(\left(\frac{\lambda'}{NA'}\right)^2 - \left(\frac{\lambda}{NA}\right)^2\right)^{1/2}, \quad (4)$$

where NA denotes the numerical aperture of the focusing lens mounted on the optical head 11.

On the basis of Expression (4), a defocus amount Z can be obtained from $\lambda'/NA'$ of the information recording medium. Therefore, the defocus amount calculating circuit 117 can be realized by an arithmetic unit which performs the calculation of Expression (4). In an alternative example, the defocus amount calculating circuit 117 may include a table which is previously obtained by calculating the relationship between $\lambda'/NA'$ and a defocus amount Z of the information recording medium, and the defocus amount is obtained by referring to the table.

Figure 3:
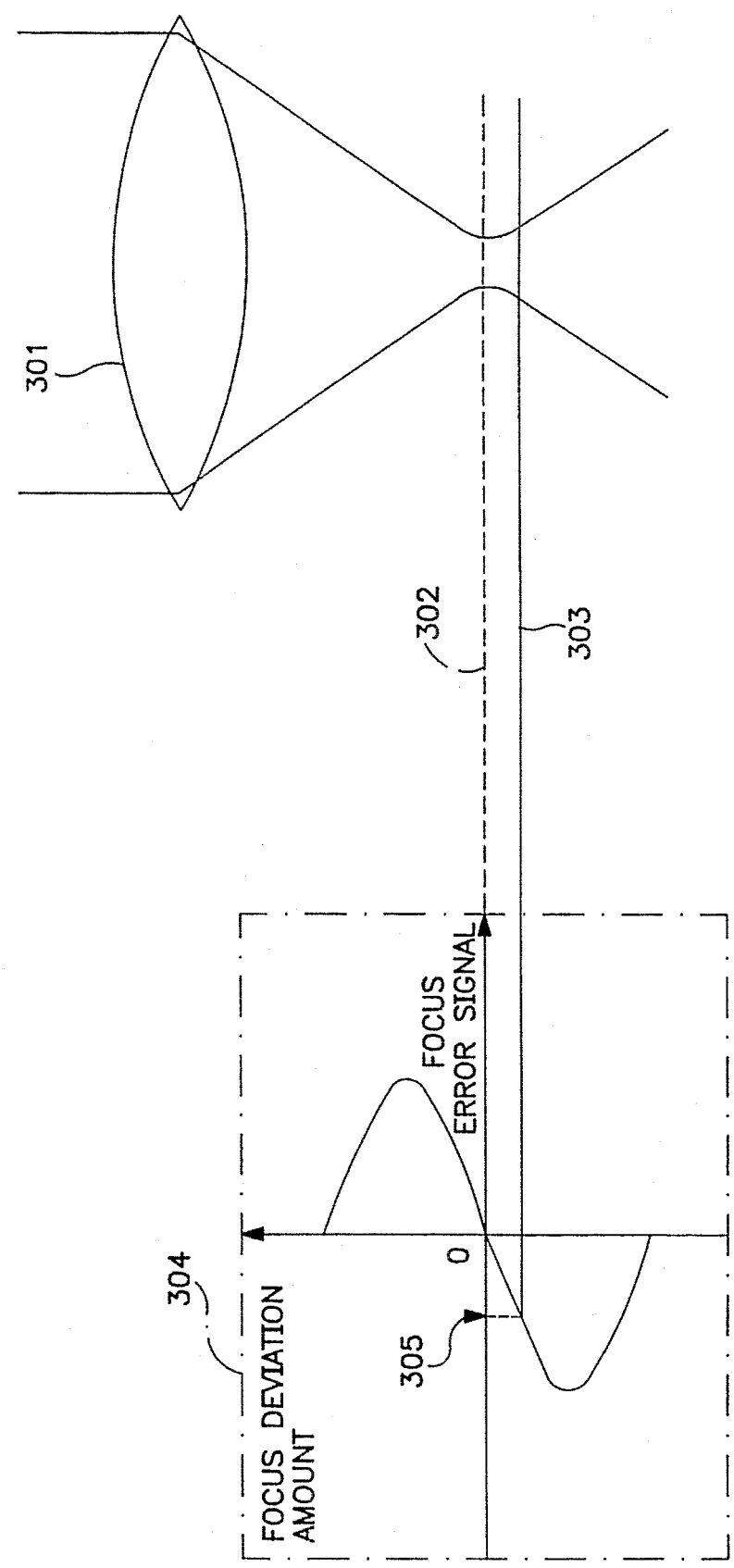
FIG. 3 illustrates the operation of a variable focus servo circuit in Example 1 according to the present invention.

The operation in the variable focus servo circuit 110 in which the thus obtained defocus amount is set will be described. FIG. 3 shows the operation of the variable focus servo circuit 110.

As is shown in FIG. 3, a laser beam is converged on a recording face 303 of the information recording medium (not shown) by an objective lens (focusing lens) 301 of the optical head 11. A face 302 is a face which includes the focal point of the laser beam and which is perpendicular to the optical axis of the objective lens 301. A graph 304 indicates a relationship between the focus error signal generated in the variable focus servo circuit 110 and a focus deviation amount representing a distance between the face 302 including the focal point and the recording face 303. The focus error signal can be detected by a knife edge method, or an astigmatic method, and the graph 304 is determined by the optical head 11. The variable focus servo circuit 110 obtains a focus offset amount 305 for the set defocus amount. The variable focus servo circuit 110 serves as a feedback control circuit for adjusting the focus deviation amount using the focus offset amount 305 as a control target.

Next, with reference to FIGS. 4A to 4C, a case will be described when an information recording medium on which information has been recorded by a conventional optical disk having a long-wavelength laser diode is used, and then information is compatibly recorded on the information recording medium by the optical information recording and reproducing apparatus 101 having a short-wavelength laser diode.

FIG. 4A shows a state where pits are recorded on an optical disk by an optical disk apparatus having a longer-wavelength laser diode, i.e., having a larger spot size. FIG.

4B shows a state where the recorded pits shown in FIG. 4A are erased by the optical information recording and reproducing apparatus 101 having a shorter-wavelength laser diode, i.e., having a smaller spot size. According to the optical information recording and reproducing apparatus 101 of this example, the spot size during the erasing is made equal to the size of the recorded pit by the defocusing, so that the recorded pits are completely erased and there is no remaining portions, as is seen from FIG. 4B.

FIG. 4C shows recorded pits in a case where information is overwritten by the optical information recording and reproducing apparatus 101 after the erasing operation. As is shown in FIG. 4C, the optical information recording and reproducing apparatus 101 of this example performs the recording operation while maintaining the defocusing state. Accordingly, the size of the recorded pits to be formed corresponds to the spot size suitable for the information recording medium. Therefore, the thus formed recorded pits can be properly reproduced by the conventional optical disk having the longer-wavelength laser diode.

In this example, a magneto-optical type optical information recording and reproducing apparatus in which the erasing operation is required prior to the recording operation has been described. Alternatively, the present invention can be applied to a phase-change type or a magneto-optical type optical information recording and reproducing apparatus in which information can be overwritten without requiring the erasing operation.

EXAMPLE 2

An optical information recording and reproducing apparatus in Example 2 according to the invention will be described with reference to the relevant figures. In this example, the spot size of a laser beam is not varied, but the erasing operation is performed twice by off-tracking the spot to both the sides with respect to the center of the track, thereby erasing the recorded pits. In this way, the recording and reproducing of information can be performed for a plurality of different type information recording mediums each having a recorded pit size based on laser wavelength.

Figure 5:
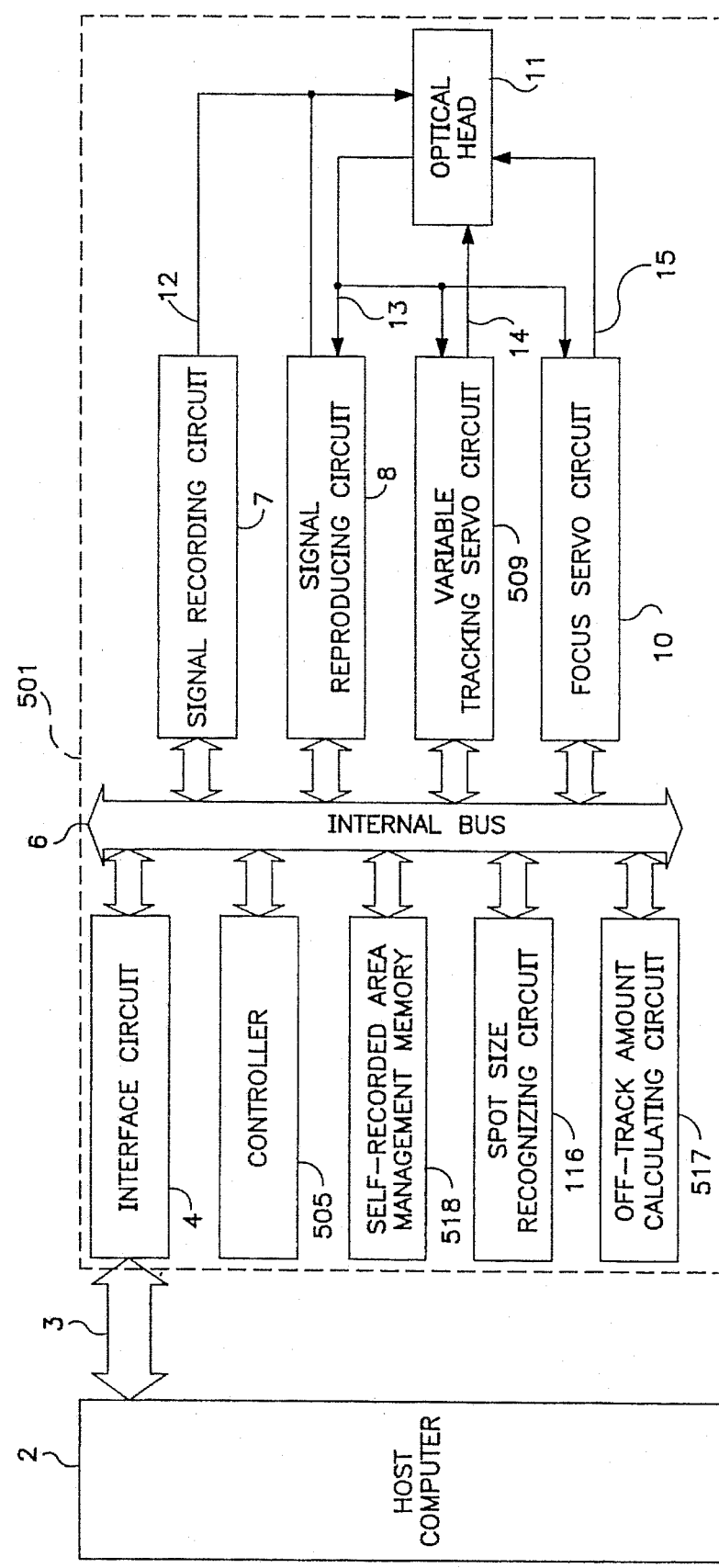
FIG. 5 is a block diagram showing a construction of an optical information recording and reproducing apparatus in Example 2 according to the present invention.

FIG. 5 is a block diagram showing the construction of the optical information recording and reproducing apparatus of this example. In FIG. 5, like components are represented by like numerals used for the optical information recording and reproducing apparatus 101 of Example 1, and the detailed descriptions thereof are omitted. As is shown in FIG. 5, the optical information recording and reproducing apparatus 501 of Example 2 is different from the apparatus 101 of Example 1 in the provision of a controller 505, a variable tracking servo circuit 509, a focus servo circuit 10, an off-track amount calculating circuit 517, and a self-recorded area management memory 518.

In the optical information recording and reproducing apparatus 501, the controller 505 controls the respective circuits via the internal bus 6 in accordance with the control programs stored therein. The focus servo circuit 10 internally generates a focus error signal and outputs a focus actuator driving signal 15 to the optical head 11 based on the generated focus error signal so that the focal point of the laser beam emitted by the optical head 11 is positioned on the recording face of the information recording medium (not shown). By the focus actuator driving signal 15, a focus actuator of the optical head 11 is driven.

The off-track amount calculating circuit 517 calculates a positive off-track amount and a negative off-track amount by obtaining a difference between the radius of the minimum spot size determined by the combination of the laser diode and the focusing lens mounted on the optical head 11 and the radius of the optimum spot size of the loaded information recording medium which is recognized by the spot size recognizing circuit 116. The controller 505 sets the calculated off-track amounts in the variable tracking servo circuit 509. Then, the variable tracking servo circuit 509 outputs a tracking actuator driving signal 14 to the optical head 11 so that the spot center of the laser beam is deviated from the center of the track of the information recording medium by the set off-track amounts. By the tracking actuator driving signal 14, a tracking actuator of the optical head 11 is driven.

Figure 6:
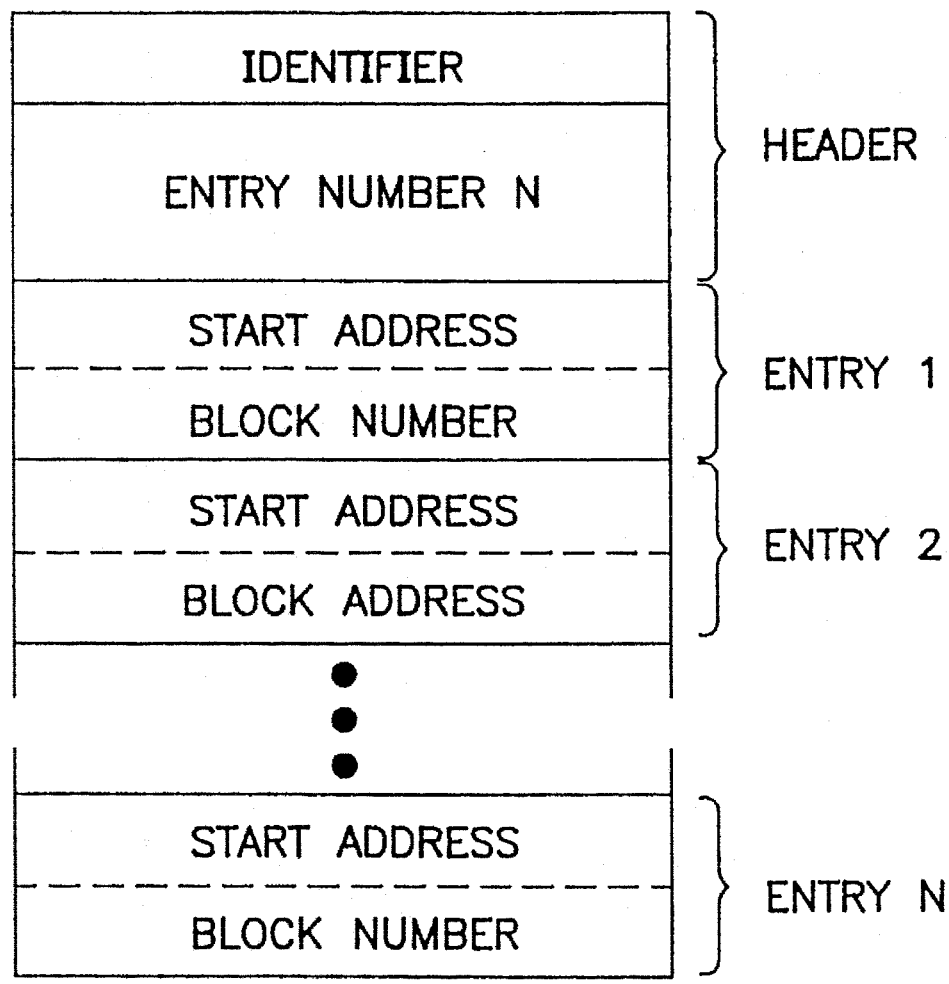
FIG. 6 is a diagram showing a format of the self-recorded area management information in Example 2 according to the present invention.

The self-recorded area management memory 518 holds the management information for separately identifying the area on which information is recorded by the optical information recording and reproducing apparatus 501 from the other area. The self-recorded area management memory 518 is described with reference to FIG. 6. FIG. 6 shows a format for the management information held by the self-recorded area management memory 518.

As is seen from FIG. 6, the management information held by the self-recorded area management memory 518 is constituted by a header and N entries. The header includes an identifier of the management information and an entry number N which indicates the number of the following entries. Each entry includes a start address indicative of the starting position of the area recorded by the optical information recording and reproducing apparatus 501, and a block number indicative of the number of following blocks. Herein, the term "block" is a unit by which an optical information recording and reproducing apparatus generally manages an information recording medium, and the term means a sector or a track.

Prior to the reception of a recording instruction from the host computer 2, the controller 505 reads the self-recorded area management information from the specific area of the information recording medium (not shown), and holds the information in the self-recorded area management memory 518. Every time the recording instruction is received from the host computer 2, the controller 505 updates the contents of the self-recorded area management memory 518. At the time before the information recording medium (not shown) is ejected, or before the power of the optical information recording and reproducing apparatus 501 is turned off, the controller 505 writes the contents of the self-recorded area management memory 518 into the specific area of the information recording medium (not shown). Accordingly, if the controller 505 refers to the contents of the self-recorded area management memory 518, the area of the information recording medium (not shown) recorded by the optical information recording and reproducing apparatus 501 can be identified.

Figure 7:
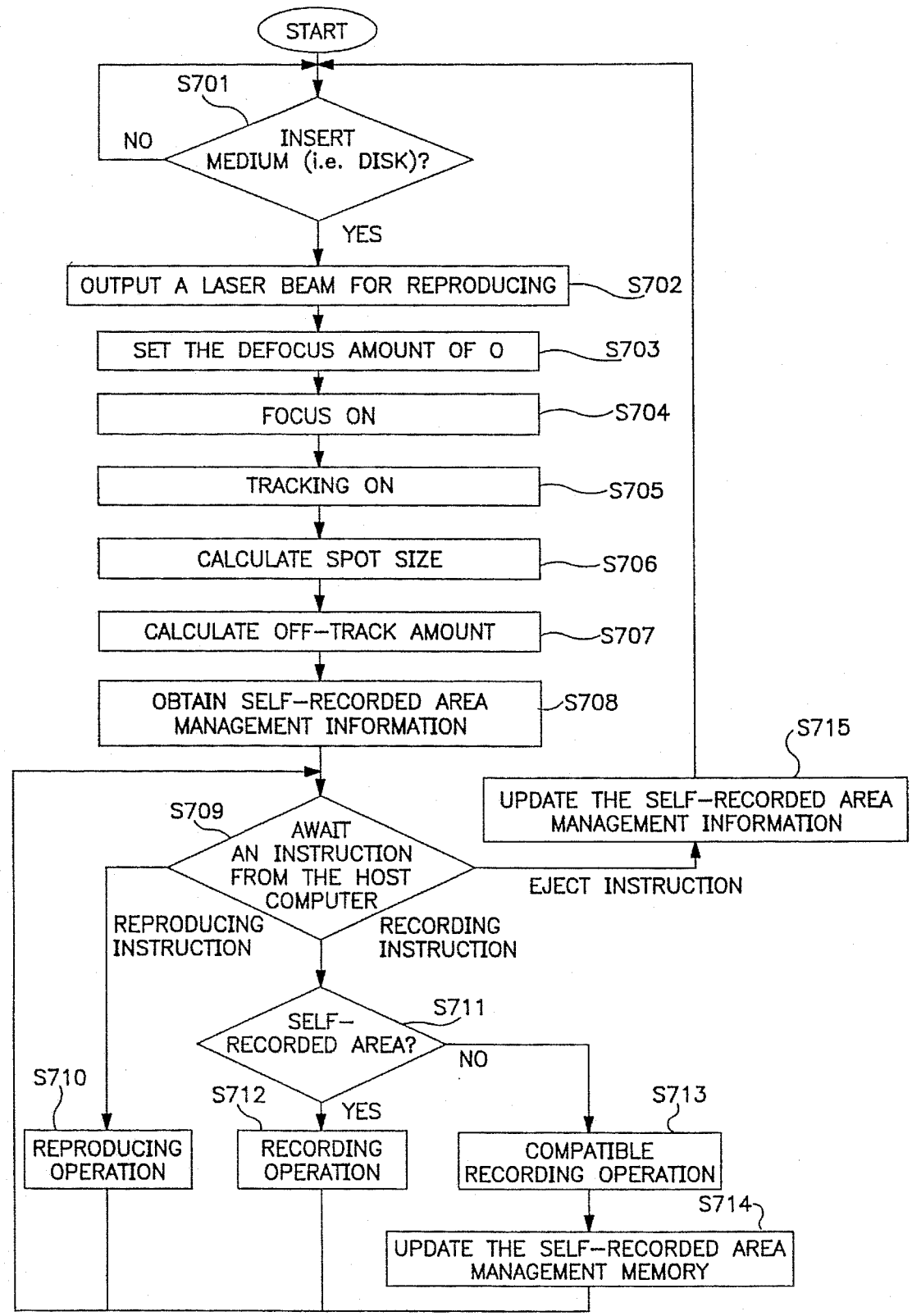
FIG. 7 is a flowchart illustrating an optical information recording and reproducing method in Example 2 according to the present invention.

Next, an optical recording and reproducing compatible control method and a self-recorded area managing method in the optical information recording and reproducing apparatus 501 having the above construction are described. FIG. 7 is a flowchart illustrating the optical recording and reproducing compatible control method and the self-recorded area managing method. These methods are implemented by the controller 505.

First, the insertion of any information recording medium, for example, a disk is awaited in step S701. When an information recording medium is inserted, the process proceeds to step S702. In step S702, the controller 505 instructs the signal reproducing circuit 8 to output the laser driving signal 12 to the optical head 11, whereby the optical head 11 emits light at the reproducing level.

Next, in step S703, the off-track amount of 0 is set in the variable tracking servo circuit 509. Thereafter, in step S704, the focus servo circuit 10 is instructed to start the focus servo operation. In step S705, the variable tracking servo circuit 509 is instructed to start the tracking servo operation.

Next, in step S706, the spot size recognizing circuit 116 recognizes the spot size suitable for the information recording medium. The recognized spot size is supplied to the off-track amount calculating circuit 517 in step S707. The off-track amount calculating circuit 517 calculates the off-track amounts and the calculated off-track amounts are stored. The off-track amounts are obtained as positive and negative values each having an absolute value which is equal to the difference between a radius of the recognized spot size and a radius of the spot size of the laser beam.

In step S708, the self-recorded area management information is read out from the specific area of the information recording medium. The thus read-out self-recorded area management information is stored in the self-recorded area management memory 518.

In step S709, an instruction from the host computer 2 is awaited. If the reproducing instruction is received, the process proceeds to step S710, and the reproducing operation from the information recording medium is performed.

If the recording instruction is received from the host computer 2, the process proceeds to step S711, and the self-recorded area management memory 518 is referred to. As the result of the reference, if the area is found to be the self-recorded area, the process proceeds to step S712. In step S712, the recording operation to the information recording medium is performed. If the area is found not to be the self-recorded area, the process proceeds to step S713. In step S713, the compatible recording operation to the information recording medium is performed. After the compatible recording operation, the contents of the self-recorded area management memory 518 are updated in step S714.

If the eject instruction is received from the host computer 2 at step S709, the process proceeds to step S715. In step S715, the contents of the self-recorded area management memory 518 are written into the specific area of the information recording medium, and then the information recording medium is ejected.

Figure 8:
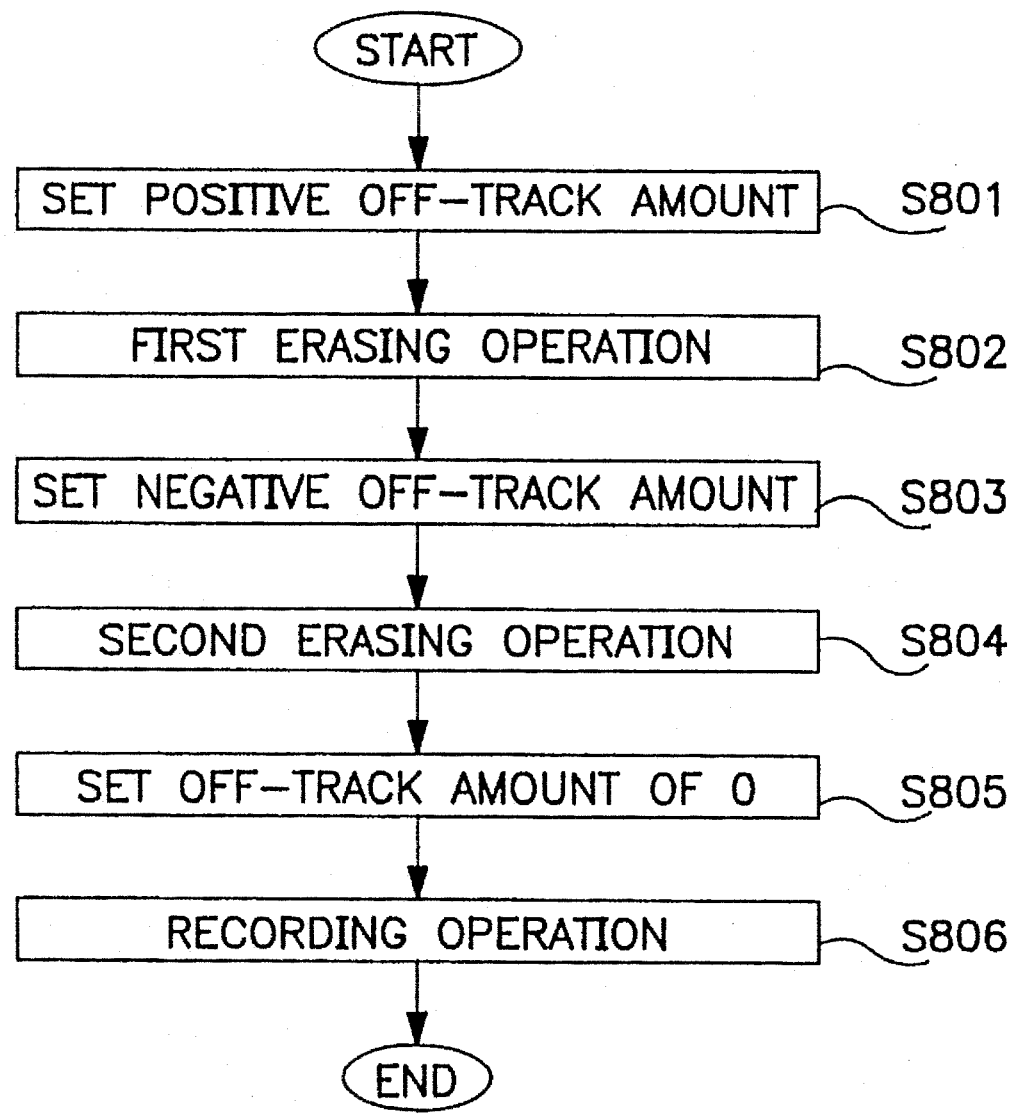
FIG. 8 is a flowchart illustrating the compatible recording operation in Example 2 according to the present invention.
Figure 9:
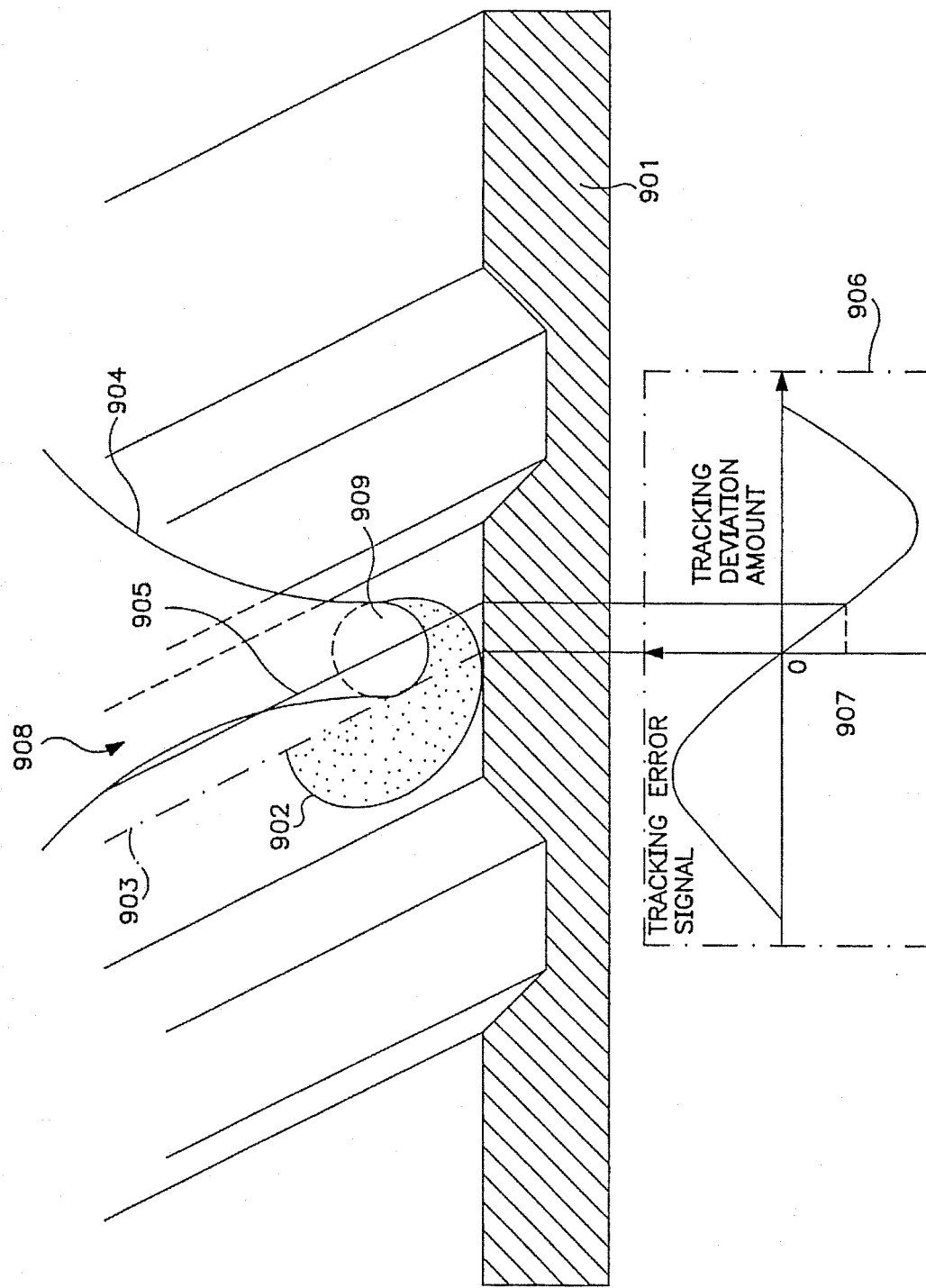
FIG. 9 is a diagram illustrating the operation of a variable tracking servo circuit in Example 2 according to the present invention.

The compatible recording operation in step S713 is described in more detail. FIG. 8 is a flowchart illustrating the compatible recording operation in detail. FIG. 9 shows the operation of the variable tracking servo circuit 509 related to the compatible recording operation.

First, in step S801, the positive off-track amount calculated by the off-track amount calculating circuit 517 is set in the variable tracking servo circuit 509. Thereafter, in step S802, the first erasing operation to the information recording medium based on the positive off-track amount is performed.

The first erasing operation is shown in FIG. 9. As is shown in FIG. 9, the information recording medium 901 includes a track 908 on which a recorded pit 902 is formed. The size of the recorded pit 902 is larger than the size of a laser spot 909 of a laser beam 904 of the optical information recording and reproducing apparatus 501 of this example. For example, FIG. 9 shows a case where the radius of the recorded pit 902 is about twice the radius of the laser spot 909. The first erasing operation is performed only on one side (the right side in the figure) of the track 908 with respect to a track center 903.

Next, in step S803, the negative off-track amount calculated by the off-track amount calculating circuit 517 is set in the variable tracking servo circuit 509. Thereafter, in step S804, the second erasing operation to the information recording medium based on the negative off-track amount is performed. The second erasing operation is performed on the other side (the left side in the figure) of the track 908 with respect to the track center 903.

Finally, in step S805, the off-track amount of 0 is set in the variable tracking servo circuit 509. Under this condition, the recording operation to the information recording medium is performed in step S806.

On the basis of the graph 906 shown in FIG. 9, the operation of the variable tracking servo circuit 509 is described in more detail. The graph 906 represents the relationship between a tracking error signal and a tracking deviation amount indicative of a distance from the track center 903 to the spot center 905. The tracking error signal can be detected by a push-pull method or the like. The graph 906 is inherently determined by the optical head 11. The variable tracking servo circuit 509 obtains a tracking offset amount 907 corresponding to the set off-track amount. The variable tracking servo circuit 509 further serves as a feedback control circuit for adjusting the tracking deviation amount using the tracking offset amount 907 as a control target.

Figure 10A:
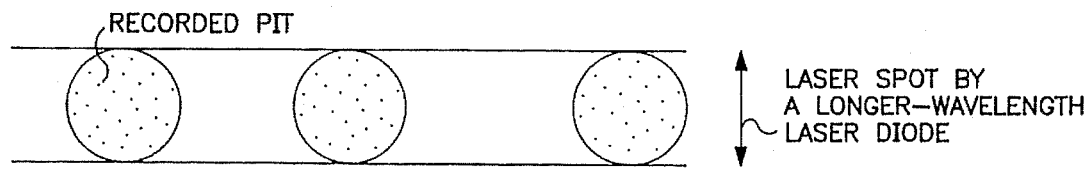
FIGS. 10A, 10B, 10C, and 10D show recorded pits in Example 2 according to the present invention.
Figure 10B:
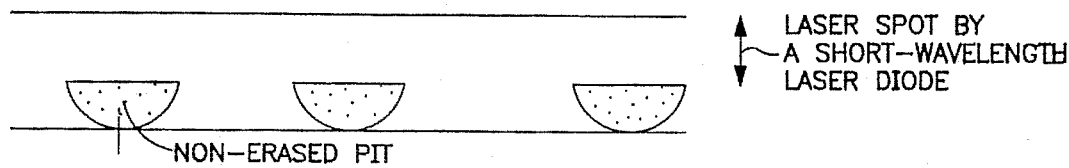
Figure 10C:
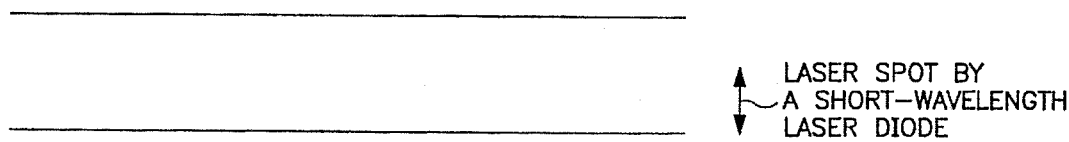

Next, with reference to FIGS. 10A to 10D, we describe a case where information is previously recorded on an information recording medium by using a conventional optical disk apparatus having a longer-wavelength laser diode, and then information is compatibly recorded on the information recording medium by using the optical information recording and reproducing apparatus 501 having a short-wavelength laser diode. FIG. 10A shows pits on the information recording medium recorded by the optical disk apparatus having a longer-wavelength laser diode, i.e., having a larger spot size. FIG. 10B shows a state where the recorded pits shown in FIG. 10A are erased by the optical information recording and reproducing apparatus 501, more specifically, a state where the erasing operation is performed by off-tracking on the upper side of the figure. In this state, the upper half or more portion of the recorded pit is surely erased, and the remaining portion smaller than the lower half portion of the recorded pit remains as the non-erased pit. FIG. 10C shows a state after the second erasing operation, more specifically, a state where the non-erased pit shown in FIG. 10B is erased by off-tracking on the lower side of the figure by the optical information recording and reproducing apparatus 501. As is seen from the figure, by the second erasing operation, the non-erased pit in FIG. 10B is completely erased.

Figure 10D:
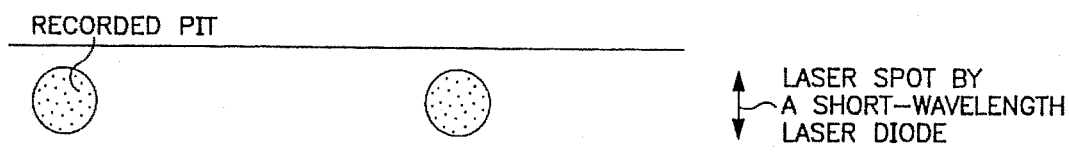

FIG. 10D shows recorded pits which are overwritten without off-tracking by the optical information recording and reproducing apparatus 501 after the completely-erased state of FIG. 10C. The smaller recorded pits are formed corresponding to the spot size, but there are no non-erased pits, so that the reproduction can properly be performed.

As apparent from the above description, in this example, since the spot size of the laser beam is small, a laser diode which necessitates lower output in order to obtain the same light amount per unit area can be used, which lowers the production cost. Moreover, the apparatus can identify the self-recorded area, so that the erasing operation is not performed a plurality of times for the self-recorded area. Accordingly, it is possible to perform the recording at a high speed.

In this example, a magneto-optical type optical information recording and reproducing apparatus in which the erasing operation is required prior to the recording operation has been described. Alternatively, the present invention can be applied to a phase-change type or a magneto-optical type optical information recording and reproducing apparatus even if the erasing operation can be performed.

In an alternative example, the recorded pits may be erased by defocusing as in Example 1, and then the recording operation may be performed with a smaller spot size without defocusing. In such a case, the self-recorded area managing method described in Example 2 can be applied.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information recording and reproducing apparatus for performing the recording and reproducing for various types of information recording media each having a converged laser spot size different from the spot sizes of the other types, comprising:

spot size recognizing means for recognizing a spot size suitable for an information recording medium which is loaded in said apparatus; and compatible recording and reproducing means for performing erasing, recording and reproducing for said information recording medium based on the spot size recognized by said spot size recognizing means, wherein said compatible recording and reproducing means includes:

variable focus servo means for adjusting a defocus amount which indicates a difference between a recording face of said information recording medium and a focal point of a laser beam emitted to said information recording medium;

defocus amount calculating means for calculating a defocus amount for compatible control, based on the spot size recognized by said spot size recognizing means and the spot size of said laser beam; and recording and reproducing compatible control means for performing erasing, recording, and reproducing by setting said defocus amount for compatible control calculated by said defocus amount calculating means in said variable focus servo means.

2. An optical information recording and reproducing apparatus according to claim 1, wherein said defocus amount calculating means calculates a defocus amount by which the spot size of said laser beam is equal to the spot size recognized by said spot size recognizing means, as said defocus amount for compatible control.

3. An optical information recording and reproducing apparatus according to claim 1, further comprising self-recorded area management means for managing an area recorded by said apparatus itself, by recording information indicative of said area recorded by said apparatus itself in a specific area of said information recording medium and by reading the information from said specific area prior to recording and reproducing, wherein, when erasing is to be performed for an area other than said self-recorded area, said compatible recording and reproducing means performs the erasing to said information recording medium based on the spot size recognized by said spot size recognizing means, and when recording and reproducing, and erasing for said self-recorded area are to be performed, said compatible recording and reproducing means performs usual recording, reproducing, and erasing.

4. An optical information recording and reproducing method for performing the recording and reproducing for various types of information recording media each having a converged laser spot size different from the spot sizes of the other types, comprising:

a spot size recognizing step for recognizing a spot size suitable for an information recording medium to be loaded; and a compatible recording and reproducing step for performing erasing, recording and reproducing for said information recording medium based on the spot size recognized by said spot size recognizing step, wherein said compatible recording and reproducing step includes:

a defocus amount calculating step for calculating a defocus amount for compatible control, based on the spot size recognized by said spot size recognizing step and the spot size of said laser beam; and a recording and reproducing compatible control step for performing erasing, recording, and reproducing under a condition that a defocus amount which indicates a difference between a recording face of said information recording medium and a focal point of a laser beam emitted to said information recording medium is set to be equal to said defocus amount for compatible control calculated by said defocus amount calculating step.

5. An optical information recording and reproducing method according to claim 4, wherein said defocus amount calculating step is a step for calculating a defocus amount by which the spot size of said laser beam is equal to the spot size recognized by said spot size recognizing step, as said defocus amount for compatible control.

6. An optical information recording and reproducing method according to claim 4, further comprising a step for recording information indicative of a self-recorded area in a specific area of said information recording medium and a step for reading the information from said specific area prior to recording and reproducing, thereby specifying the self-recorded area, wherein said recording and reproducing compatible control step includes:

a step for performing, when erasing is to be performed for an area other than said self-recorded area, the erasing to said information recording medium based on the spot size recognized by said spot size recognizing step; and a step for performing, when recording and reproducing, and erasing for said self-recorded area are to be performed, usual recording, reproducing, and erasing.

* * * * *

UNITED STATES PATENT AND TRADEMARK OFFICE
CERTIFICATE OF CORRECTION

PATENT NO. : 5,541,900
DATED : July 30, 1996
INVENTOR(S) : Ito et al

It is certified that error appears in the above-indentified patent and that said Letters Patent is hereby corrected as shown below:

Delete Drawing Figure 6, and substitute therefor the Drawing Sheet, consisting of Figure 6, as shown on the attached pages.

UNITED STATES PATENT AND TRADE MARK OFFICE
CERTIFICATE OF CORRECTION

PATENT NO.  : 5,541,900
DATED       : July 30, 1996
INVENTOR(S) : Ito et al.

It is certified that error appears in the above-identified patent and that said Letters Patent is hereby corrected as shown below:

On the Cover Page, item:[56], References Cited, Foreign Patent Documents, please change "1-43020" to read --1-143020.

In Column 1 (lines 48, 51 and 55) and in Column 8 (lines 8 and 15), "W" should be --ω--.

Signed and Sealed this

Eighteenth Day of February, 1997

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,541,900
DATED     : July 30, 1996
INVENTOR(S) : Ito, et al

It is certified that error appears in the above-identified patent and that said Letters Patent is hereby corrected as shown below:

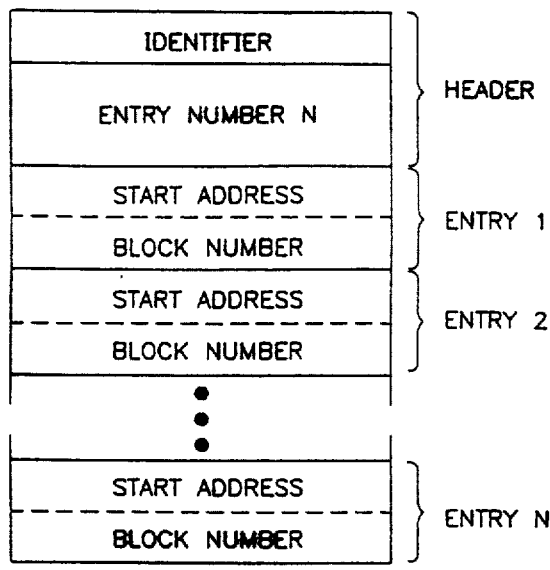

FIG. 6